H. HAAK.
Grain Gage.
No. 59,213.
Patented Oct. 30, 1866.
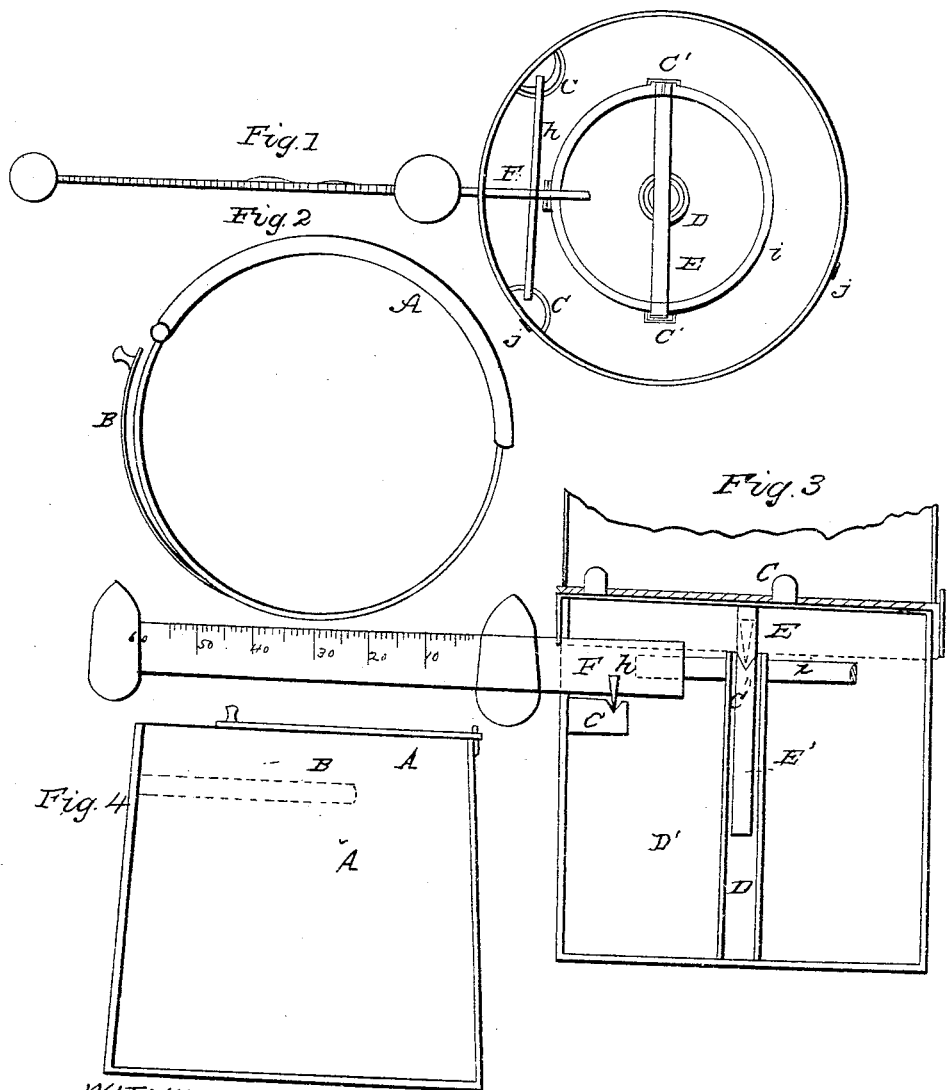
WITNESSES
William Urich
J. W. Barrach
INVENTOR
Henry Haak

UNITED STATES PATENT OFFICE.

HENRY HAAK, OF MYERSTOWN, PENNSYLVANIA.

IMPROVEMENT IN GRAIN-GAGES.

Specification forming part of Letters Patent No. 59,213, dated October 30, 1866.

*To all whom it may concern:*

Be it known that I, HENRY HAAK, of Myerstown, in the county of Lebanon, in the State of Pennsylvania, have invented a new and Improved Grain-Gage; and I hereby declare that the following is a full and exact description thereof, reference being had to the accompanying drawings, and to the letters of reference marked thereon.

The nature of my invention consists in determining the exact quantity of flour contained in different qualities of wheat to the bushel. By this instrument or scale the respective quantities of flour to the sixtieth (60th) part of the weight of a bushel may be ascertained, the beam of the scale being properly graduated for this purpose.

F, Figure 1, is a plan of the scale; Figs. 2 and 4, the measure, which, when set in the scale, will balance the same.

A is the striker, and B a spring attached to the side of the measure for the purpose of giving the measure a knock or rap to settle the wheat more compactly together, thereby very exactly giving the same quantity at every measure before weighing. The measure, Fig. 4, being filled, is set on the balance, as shown by a section of it in Fig. 3. The cover or platform G is attached to the balance-beam E, and the stem E' is also attached to this beam, and is set in the upright tube D to keep the bearings C' C' in position. This tube D is attached to the bottom of the stand. The other support, $h$, is attached to the beam F, with its bearings C $i$. Fig. 1 is a ring attached to the beam F, and in which the cover or platform rests with its bearings at C'. $j\ j\ j$ are guides or stays to keep the measure in place when on the platform.

Having thus fully described my invention, what I claim, and desire to secure by Letters Patent, is—

1. The measure A', provided with the spring and striker A and B, constructed and operated substantially as described.

2. The graduated beam F, the bearing-beam E, tube D, and stem E', arranged and operated as described.

HENRY HAAK.

In presence of—
  WM. R. BRADFORD,
  CHAS. WILSON,
  WILLIAM URICH.